US008207083B2

(12) United States Patent
Berben et al.

(10) Patent No.: US 8,207,083 B2
(45) Date of Patent: Jun. 26, 2012

(54) NICKEL CATALYST FOR HYDROGENATION REACTIONS

(75) Inventors: Pieter Hildegardus Berben, Maarn (NL); Tjalling Rekker, Culemborg (NL)

(73) Assignee: BASF Corporation, Florham Park, NJ (US)

( * ) Notice: Subject to any disclaimer, the term of this patent is extended or adjusted under 35 U.S.C. 154(b) by 577 days.

(21) Appl. No.: 12/411,484

(22) Filed: Mar. 26, 2009

(65) Prior Publication Data

US 2009/0182181 A1 Jul. 16, 2009

Related U.S. Application Data

(62) Division of application No. 10/531,782, filed as application No. PCT/NL03/000705 on Oct. 17, 2003, now Pat. No. 7,528,092.

(30) Foreign Application Priority Data

Oct. 18, 2002 (EP) .................................... 02079362

(51) Int. Cl.

| | |
|---|---|
| ***B01J 21/00*** | (2006.01) |
| ***B01J 23/58*** | (2006.01) |
| ***B01J 23/00*** | (2006.01) |
| ***B01J 23/02*** | (2006.01) |
| ***B01J 23/06*** | (2006.01) |

(52) U.S. Cl. ........ 502/252; 502/251; 502/259; 502/263; 502/328; 502/335; 502/341

(58) Field of Classification Search .................. 502/251, 502/252, 259, 263, 328, 335, 341
See application file for complete search history.

(56) References Cited

U.S. PATENT DOCUMENTS

| | | | | |
|---|---|---|---|---|
| 4,532,351 | A | 7/1985 | Barnett et al. | |
| 4,631,265 | A | 12/1986 | Oudejans et al. | |
| 5,616,531 | A | 4/1997 | Feldhauser et al. | |
| 7,528,092 | B2 * | 5/2009 | Berben et al. | 502/251 |

FOREIGN PATENT DOCUMENTS

| | | |
|---|---|---|
| DE | 2850719 | 10/1980 |
| EP | 0597662 | 5/1994 |
| EP | 1101530 | 5/2001 |
| WO | 9530481 | 11/1995 |

OTHER PUBLICATIONS

International Search Report for PCT/NL03/00705 dated Feb. 12, 2004.

International Preliminary Examination Report for PCT/NL03/00705 dated Jan. 27, 2005.

* cited by examiner

*Primary Examiner* — Patricia L Hailey
(74) *Attorney, Agent, or Firm* — Bernard Lau

(57) ABSTRACT

The present invention relates to a catalyst nickel, silica, alumina and magnesium, wherein the nickel to magnesium atomic ratio is 5-75. In particular the present invention relates to a catalyst comprising nickel, silica, alumina and magnesium, wherein the nickel to silicium atomic ratio (Ni/Si) is 2 to 30 to nickel to aluminum atomic ratio (Ni/Al) is 9 to 40 and the nickel to magnesium atomic ratio (Ni/Mg) is 5-75. The invention further relates to a method for preparing such a catalyst. The invention further relates to a process for hydrogenating unsaturated organic compounds.

20 Claims, No Drawings

NICKEL CATALYST FOR HYDROGENATION REACTIONS

The invention relates to a catalyst comprising nickel, alumina magnesium and silica, to a method for preparing such a catalyst and to a process for hydrogenating unsaturated organic compounds.

Nickel/alumina catalysts with a nickel/aluminium ratio of 2-20 are known to be active catalysts for the hydrogenation of unsaturated organic compounds from EP-A 0 167 201. The catalysts claimed in EP-A 0 167 201 further comprise silica in a nickel/silica ratio of 1-20. The disclosed catalysts are prepared in a process wherein first a nickel hydroxide/carbonate is precipitated and thereafter aluminium nitrate and silicate are added. The resulting precipitate is thereafter activated with hydrogen. The examples show catalysts comprising at least 85 wt. % Ni that are used in the hydrogenation of fish oil. It is reported that they may retain their activity for a prolonged period and tend to show a high poison resistance. As an indication for selectivity an aspecific assay is referred to, based on a combination of melting point and hydrogenation time. Besides the fact that the latter parameter has been found to be rather an indicator for activity, no quantitative data are presented on the selectivity in soy bean oil hydrogenation though.

EP-A 1 101 530 describes a nickel-iron catalyst for use in the hydrogenation of resins. Magnesium (oxide) may be present. This publication does not recognise the relevance of the particle size with respect to the hydrogenation of unsaturated compounds and the working examples do not mention the particle size of the used catalyst. It is not suggested to use the catalyst in the hydrogenation of fatty substances, such as vegetable or animal oils.

U.S. Pat. No. 5,493,037 relates to a fixed bed process for hydrogenating fatty acids, comprising the use of a formed nickel catalyst with a relatively low nickel content. Contents of 10-50 wt. % are mentioned, without specifying how the weight percentage is defined. A magnesium salt may be present as a support or in the binder (clay). The publication is silent about suitable pore volumes and nickel surface areas.

There is a continuing need for alternative catalysts for the hydrogenation of unsaturated organic compounds. In general when searching for a suitable catalyst for the hydrogenation of a particular compound, one has to compromise e.g. between activity and selectivity. For instance, certain catalyst characteristics (e.g. an open pore structure) may favour the selective hydrogenation of fatty oils while at the same time result in longer reaction times when hydrogenating more contaminated oils because of their higher susceptibility to poisoning. Therefore, often different types of catalysts are required for different types of unsaturated organic compounds. For example, a catalyst may either be suitable for clean oils, such as soy bean oil, or for more contaminated oils, such as rape seed oil or fish oil.

It is an object of the present invention to provide a novel catalyst that may be used as a favourable alternative to known catalysts for hydrogenating unsaturated organic compounds, in particular fatty oils.

It has been found that this object can be realised by a catalyst comprising nickel, silica, alumina and also magnesium in a particular ratio.

Accordingly, the present invention relates to a catalyst comprising nickel, silica, alumina and magnesium, wherein the nickel to magnesium atomic ratio is 5-75, preferably 5-50.

In the catalyst, magnesium is thought to act as a catalyst promotor in the hydrogenation of unsaturated hydrocarbons, in particular fatty substances, as is indicated by the Examples 1 and 2, below.

In particular, the present invention relates to a catalyst comprising nickel, silica, alumina and magnesium, wherein the nickel to silicium atomic ratio (Ni/Si) is 2 to 30, the nickel to aluminium atomic ratio (Ni/Al) is 9 to 40 and the nickel to magnesium atomic ratio (Ni/Mg) is 5-75.

It has been found that a catalyst according to the present invention shows a very high activity for the hydrogenation of unsaturated compounds, in particular unsaturated fatty substances, such as fatty oils including unsaturated fats. These oils typically mainly comprise glycerides, in particular triglycerides. The invention may very suitably be employed for the hydrogenation of fatty substances of vegetable and/or animal origin for food grade applications.

A catalyst according to the invention has been found to have a very high activity as a hydrogenation catalyst. In particular, a catalyst according to the invention is found to be highly active for relatively clean oils—i.e. oils with a relatively low sulphur content—like soy bean, as well as for more contaminated oils, like fish oil, having a high sulphur content.

A catalyst according to the invention may very suitably be used in a slurry process. Accordingly the present invention also relates to a slurry comprising a catalyst according to the invention. The skilled person will know how to make a suitable slurry based upon common general knowledge and the information disclosed herein. For instance, as a liquid phase the feed stock to be processed is very suitable.

The total weight percentage of Ni in the reduced catalyst may be chosen in a wide range, as defined by the Ni/Si, Ni/Al and Ni/Mg ranges. Preferably, the amount of nickel is at least 50 wt. % and not higher than 80 wt. %, more preferably 51-80 wt. %. Even more preferably the amount of nickel is 55-75 wt. %. Very good results have been achieved with an amount of nickel of 65-72 wt. %.

In a preferred embodiment, Ni/Si is at least about 2.5, more preferably at least about 3. Very good results have been achieved with a Ni/Si of at least 6.5.

The Ni/Si is preferably about 22 or less, more preferably about 15 or less. Very good results have been achieved with a Ni/Si of up to about 7.5.

Ni/Al is preferably about 10 to about 35, more preferably about 10-30, even more preferably about 15-25. Very good results have been achieved with a catalyst having a Ni/Al of more than 20, e.g. up to 22.

Ni/Mg may preferably be chosen in the range of about 5-50, more preferably 5-30, even more preferably about 6 to about 20. Very suitable is a catalyst with a Ni/Mg of about 7.5-12.5, e.g. about 10.

In principle it is possible that small amounts of one or more other elements are present in the catalyst, but this is not required. In particular, very suitable is a catalyst of the invention which is essentially free of iron (typically having less than 0.1% Fe).

In order to prevent oxidation of the catalyst may be coated with a protective layer. The protective layer may have any form, wherein at least the catalytically active sites of the catalyst are essentially covered with a protective material.

Protection of the catalyst is in principle possible by applying a layer of oxide on the catalyst; in particular on the nickel (crystallites). A method for applying a suitable film of oxide is known in generally known in the art, and may be based on DE19909175. The oxide may suitably be removed shortly before use. The skilled person will know how to remove (e.g. by reactivation) the oxide, based upon a known method for reactivating known nickel catalysts on a support (e.g. on alumina, silica or a combination thereof).

A highly suitable protective material for protecting a catalyst, such as a hydrogenation catalyst, in particular a catalyst according to the invention, is a material comprising a fatty substance, preferably a hardened oil or fat, more preferably a hardened vegetable oil or fat. Very good results have been achieved with a catalyst coated with hardened soy bean fat. Other highly preferred examples of fatty substances include hardened palm oil fat, hardened sunflower oil and hardened rapeseed oil. A mixture comprising a number of fatty substances may very suitably be used.

An advantage of a protective material comprising a fatty substance instead of a thin film of oxide on the catalyst, is that the catalyst does not need to be re-activated before use. At a high temperature (e.g. above about 150° C.) re-activation will generally be possible without a problem but in particular for low temperature applications or for applications wherein the reaction is started at a relatively low temperature (e.g. below 150° C.), re-activation of a catalyst with a protective oxide film may take a relatively long time, resulting in a longer overall reaction time, or may not take place to a sufficient extent at all.

The protective material forming a protective layer may be provided around individualised particles, or at least on the catalytically active part thereof (in particular in case a layer of oxide).

In particular in case of a catalyst provided with a fatty substance as a protective layer, a multiplicity of catalyst particles may be incorporated (in particular dispersed) into the protective material forming the protective layer.

The protective material with catalyst particles incorporated therein, may very suitably be in the form of a particulate material. Such particulate material is also referred to herein as matrix particles. The size of the matrix particles is not particularly critical. Conveniently, matrix particles may for instance have a size (as defined by the diameter of the enveloping circle) in the range of about 1 to about 12 mm, more in particular in the range of about 2-10 mm. The size of the catalyst particles incorporated therein is usually at least about one or two orders of magnitude less than the matrix particles. A preferred size of the catalyst particles is as the preferred particle diameters defined below.

It has been found that in particular in an embodiment wherein the catalyst is provided with a protective layer by having the catalyst incorporated into the protective material, the ease of handling is improved, because it contributes to reduced dusting of the catalyst.

The amount of protective material is preferably at least about 40 wt. %, more preferably at least about 55 wt. % even more preferably at least about 60 wt. %. Very good results have been achieved with an amount of at least 65 wt. %. (All wt. %'s based upon the total weight of catalyst plus protective material).

Preferably the amount of protective material is less than about 95 wt. %, more preferably less than about 90 wt. %, even more preferably less than about 85 wt. %. Very good results have been achieved with a weight percentage of up to about 82 wt. % (All wt. %'s based upon the total weight of catalyst plus protective material).

The melting temperature of the protective material with which the catalyst is coated is preferably less than the temperature at which the hydrogenation is carried out, in order to facilitate dissolution of the protective material at the beginning of a hydrogenation process in accordance with the invention. Good results have inter alia been achieved with a protective material have a melting temperature of less than about 90° C., more in particular of less than about 85° C. Very good results have been achieved with a melting temperature of less than 80° C.

For practical reasons, the minimum melting temperature of the protective material is in general higher than the temperature at which the catalyst is stored before use. Preferably the melting temperature is at least about 40° C., more preferably at least about 50° C.

In particular, when the catalyst is used in a slurry process, the protective coating will preferably dissolve in the feedstock. Else, the coating may be removed from the process, shortly before using the catalyst in a hydrogenation process. The coating may very suitably be removed by contacting the catalyst with a solvent, such as a feedstock, preferably at a temperature higher than the melting point of the coating fat.

For a good activity, the pore volume (as measured by $N_2$ desorption, 20-600 Å, on a Quantachrome Autosorb 6) is preferably at least 0.4 ml/g, more preferably at least 0.5 ml/g, even more preferably at least 0.55 ml/g. The upper limit is not particularly critical. Very good results have been achieved in the range of 0.4 to 1 ml/g. More preferably, the pore volume is up to about 0.75 ml/g, e.g. 0.6-0.7 ml/g.

The volume average particle size (D(v.0,5)) of a catalyst according to the invention may be chosen in a wide range, inter alia depending upon the intended use, in particular if the catalyst is provided with a protective coating.

In practice, in particular for improving the hydrogenation reaction rate of unsaturated fatty substances, one may favourably choose to use a catalyst with a D(v.0,5) of less than about 20 μm. Very suitable is a D(v.0,5) of less than about 15 μm, in particular of less than about 10 μm, more in particular of less than about 8.5 μm.

The volume average particle size is preferably at least about 1 μm, more preferably at least about 2 μm, even more preferably at least about 3.

A volume average particle size in the range of about 3 to about 8 μm has been found to be highly advantageous. In particular when compared to a catalyst with a higher average particle size (e.g. 8.6 μm) such a catalyst has been found to have a higher activity with respect to hydrogenation of a unsaturated organic compound, especially a fatty substance.

Very good results have been achieved with a catalyst having a volume average particle size of about 4 to about 7 μm.

D(v.0,5), as used herein, is the value as measured by LASER diffraction with a Malvern MS 1002, lens 45 mm—which corresponds to a measuring range of 0.1-100 μm—using "Independent" as the model for calculating the particle size. The (D(v.0,5)) as used herein is the diameter of the catalyst per se, i.e. without a protective coating.

The catalyst preferably comprises nickel crystallites. The majority of the nickel crystallites preferably has a diameter of less than 60 Å, more preferably of about 20-50 Å, even more preferably of about 20-40 Å. The size as used herein is the value as determinable by XRD on the reduced catalyst protected by a coating of a fatty substance (such as hardened soybean fat) (See also Examples).

The nickel surface area is preferably 75 to 200 $m^2/g$ of nickel, more preferably approximately 100-175 $m^2/g$ of nickel, even more preferably approximately 100-150 $m^2/g$ of nickel. Very good results have been achieved with a catalyst having a nickel surface area of 110-145 $m^2/g$ of nickel. The nickel surface area as used herein is the value as can be determined by hydrogen chemisorption at 50° C., after in situ reduction with hydrogen (60 ml/min) for 2 hours at 400° C. and subsequently degassing for 14 hours at 350° C. in a Carlo Erba Sorptomatic 1900. The amount of adsorbed hydrogen is determined by extrapolation of the reduction isotherm to zero pressure and the nickel surface area is calculated assuming a site density of 6.77 Å$^2$/atom.

The BET surface area preferably is about 300 to about 450 $m^2$/g catalyst, more preferably about 350 to about 400 $m^2$/g catalyst. The BET surface area as used herein is the value that can be measured by determining the amount of nitrogen adsorbed at 77 K and $P/P_0$ of approximately 0.3 and assuming a nitrogen cross sectional area of 16.2 Å$^2$, after degassing the catalyst sample at 180° C.

The average pore diameter (APD), as calculated from the measured pore volume (PV) and BET surface area by the formula APD=40000*PV/BET, may for example very suitably be chosen in the range of about 10-500 Å, preferably in the range of about 40-200 Å, more preferably about 60-100 Å.

It is possible to make a catalyst in a process wherein first a nickel precipitate is made, which is subsequently aged with an alumina source and with a silica source (which may be added together with the alumina or thereafter).

In a preferred embodiment, the catalyst is made from a catalyst precursor that is prepared by co-precipitation, of which it will be clear to the skilled professional how to choose suitable method conditions. In a co-precipitation method according to the invention nickel, alumina, silica and magnesium are precipitated together (i.e. without forming intermediate precipitates of only one or some of the components). In such a method, a nickel source, a silica source, an alumina source and a magnesium source may be mixed in a liquid (e.g. water or an aqueous solution) to form a precipitate (a catalyst precursor), comprising all four said components.

Preferably the co-precipitation is carried out with the aid of a precipitant, e.g. an alkali metal carbonate (such as $Na_2CO_3$) or an alkali metal hydroxide (such as NaOH).

It is an advantage of the above co-precipitation methodology that it can be performed in a single co-precipitation step.

Very good results have been achieved with a method wherein the co-precipitation is performed at alkaline pH, e.g. at a pH of approximately 7.5-8.5 (as measured at 25° C.). It has been found that under alkaline conditions a very efficient, generally a substantially complete precipitation of nickel and magnesium, can be realised, in particular at elevated temperatures e.g. in the range of 50-100° C.

In a preferred embodiment, the precipitation is carried out at a temperature in the range of 20-100° C. Very good results have been achieved at a temperature in the range of 50-100° C., in particular at a temperature in the range of 75-98° C. The catalyst precursor may thereafter be isolated, e.g. by filtration, from the liquid and calcined, e.g. at a temperature of 200-750° C. for 1-5 hours. The catalyst may very suitably be activated by reduction with hydrogen, e.g. at a temperature of 250-600° C., e.g. for 1-5 hours.

The nickel, silica, alumina and magnesium sources may be chosen from sources commonly used to prepare catalysts.

Suitable nickel sources include inorganic nickel salts, preferably $Ni(NO_3)_2$, $NiCl_2$, $NiSO_4$, and organic nickel salts, preferably nickel acetate. Preferably the nickel source is a solution or suspension of any of these salts.

Suitable silica sources include water glass, sodium silicate ($Na_2SiO_3$) and colloidal silica. Preferably the silica source is a solution or suspension of any of these components.

Suitable alumina sources include aluminum salts, preferably inorganic salts such as $AlCl_3$, $Al(NO_3)_3$ and sodium aluminate ($NaAlO_2$). Preferably the alumina source is a solution or suspension of any of these salts.

Suitable magnesium sources include magnesium salts, preferably inorganic salts such as $Mg(NO_3)_2$, $MgCl_2$, and $MgSO_4$. Preferably the magnesium source is a solution or suspension of any of these salts.

The catalyst may be coated with a protective layer, e.g. a fatty substance such as hardened soy bean fat, hardened palm oil fat, hardened sun flower oil fat or a combination thereof, which may serve to avoid oxidation of (parts of) the catalyst (see also above).

The skilled person will know how to provide a protective coating, based upon common general knowledge and the information disclosed herein. This may for example be done by blending a (reduced) catalyst powder into the molten coating material (such as the molten fat) and subsequently solidifying the resulting suspension to form flakes or droplets of coated catalyst particles. For instance, one may let droplets of the suspension fall on a surface having a temperature below the melting temperature of the fatty substance (such as a cooled plate) thereby solidifying the droplets to form matrix particles. Such method is very suitable for preparing particles generally having an essentially hemispherical shape. Another way to produce matrix particles is to let the droplets fall in a fluid (generally cooled fluid) wherein the particles solidify. Thus more or less spherical matrix particles may be formed. It is also an option to flake the suspension to flakes of a suitable thickness.

A catalyst according to the present invention may be used for a variety of applications, and in particular for catalytic hydrogenation. The catalyst may be employed in a process for hydrogenating organic compounds wherein said compound is contacted with hydrogen in the presence of the catalyst. The process conditions may be chosen from the processes typically used for the hydrogenation of a particular compound. The process may be a batch or a continuous process. Preferably, the process is a slurry-process.

An important advantage of a hydrogenation process according to the invention is the possibility to decrease the dosage of catalyst in order to achieve a particular conversion within the same hydrogenation time (contact time of feed (substrate) and catalyst) or to reduce the hydrogenation time at a particular catalyst dosage.

A process according to the invention has been found to be particularly suitable for the hydrogenation of a relatively clean oil (e.g. soy bean oil) and/or a more contaminated oil (e.g. fish oil or rape seed oil).

A fatty substance hydrogenated in accordance with the present invention preferably mainly comprises triglycerides, such that the content of free fatty acids is quite low. For instance in a preferred feed stock hydrogenated in accordance with the invention, such as a fully refined vegetable or animal oils, usually less than about 0.1 wt. % free fatty acids and preferably less than 0.05 wt. % is present. Since high concentrations of free fatty acids may deactivate the catalyst by nickel soap formation, their presence is preferably below said levels.

On the one hand it has been found possible to maintain a high activity in the presence of contaminations such as sulphur in the contaminated oil. On the other hand the selectivity has been found to remain high enough to achieve a favourable conversion of the unsaturated compounds. As a result the present invention also offers a considerable advantage since it offers the advantage that a single type of catalyst can very favourably be used in the hydrogenation of contaminated oil and also in the hydrogenation of clean oil. Thus a single stock of catalyst may be kept for the conversion of either of these products.

The invention will now be illustrated by the following examples.

EXAMPLE 1

A metal solution (1000 ml) containing 95 g Ni/l and 5 g Mg/l was prepared from a $NiCl_2$ solution (198 g Ni/l) and $MgCl_2.6H_2O$. The base solution was prepared by dissolving 183 g $Na_2CO_3$ and 44.4 g $Na_2SiO_3.5H_2O$ in 1000 ml of demineralised water. The metal and base solution were injected at equal flow rates (1000 ml/hr) into a well stirred precipitation vessel containing 1725 ml of demineralised water and 3.8 g of $Al_2O_3$ as sodium aluminate. The temperature during precipitation was maintained at 95° C. while the pH was between 7.5 and 8.5.

After precipitation the precipitate was washed with demineralised water and dried overnight at 110° C. The dried catalyst was calcined for 1.5 hours at 375° C. and subsequently activated by reduction in hydrogen for 2 hours at 400° C. The reduced catalyst powder was protected from air oxidation by dispersing it in an inert atmosphere in molten, hardened soybean fat at 80-100° C. Catalyst flakes were formed by solidifying the blend of reduced catalyst powder and coating fat on a cooling plate. The catalyst properties of the calcined sample are as summarised in Table 1.

EXAMPLE 2

The catalyst of Example 2 was prepared according the procedure as described in Example 1, except that no magnesium was added.

EXAMPLE 3

The catalyst of Example 3 was prepared according the procedure as described in Example 1, except that no alumina was added.

EXAMPLES 4 AND 5

The catalysts of Examples 4 and 5 were prepared according to the procedure as described in Example 1, except that variations were made in the amount of starting materials resulting in catalyst properties as indicated in Table 1.

EXAMPLES 6 AND 7

The catalyst of Examples 6 and 7 were prepared according to the procedure as described with example 1, except that magnesium was replaced by copper and cobalt respectively.

EXAMPLE 8

The catalyst of Example 8 was prepared according to the procedure as described in Example 1 except that a different agitation speed was used during the precipitation. (an agitation speed of 400 instead of 475 rpm was used).

EXAMPLE 9

Characterisation and Performance of the Catalysts

The pore volume and BET surface area of the catalysts were measured by nitrogen adsorption/desorption using a Quantachrome Autosorb-6. Particle size was determined by laser diffraction using a Malvern Mastersizer 1002. The nickel surface area was measured by hydrogen chemisorption with a Carlo Erba Sorptometic 1900.

The nickel crystallite size was measured with a Phillips DW1820 röntgen diffractometer using the Ni(111) peak (d-value 2.06 Å).

The soy bean oil (SBO) hydrogenating activity of the catalysts was determined by the hydrogenation of 500 g of soybean oil (iodine value 130) and measuring the time needed to reach an iodine value of 70. The catalyst loading was 0.0075% as nickel, the hydrogen pressure was 0.7 bar and the temperature was 204° C. The iodine value was measured by the Wijs method as described in A.O.C.S. Official Method Cd 1-25 (1990).

The fish oil (FO) hydrogenation activity of the catalysts was determined by the hydrogenation of 500 g of fish oil (iodine value 160) at 180° C., 2 bar hydrogen pressure and a nickel loading of 0.031%. The activity is expressed as the time in minutes required to reach an iodine value (IV) of 115. The iodine value was measured by the Wijs method.

TABLE 1

Properties of the catalysts.

| | Example 1 | Example 2 | Example 3 | Example 4 | Example 5 |
|---|---|---|---|---|---|
| Calcined catalyst | | | | | |
| Ni content (%) | 58.5 | 62.3 | 76.2 | 68.8 | 72.3 |
| Ni/Si atomic ratio | 7.0 | 6.8 | 8.8 | 5.5 | 20.1 |
| Ni/Al atomic ratio | 20.1 | 19.7 | — | 30.6 | 9.8 |
| Ni/Mg atomic ratio | 10.1 | — | 13.7 | 31.9 | 39.2 |
| Pore volume (ml/g cat) | 0.57 | 0.65 | 0.44 | 0.51 | 0.68 |
| BET area ($m^2$/g cat) | 377 | 375 | 385 | 387 | 303 |
| Av. pore diameter (Å) | 60 | 69 | 45 | 53 | 90 |
| Particle size (μm) | 6.8 | 6.8 | 13.4 | 8.3 | 6.4 |
| Nickel surface area ($m^2$/gNi) | 144 | 104 | 105 | 109 | 101 |
| Reduced catalyst | | | | | |
| Nickel crystallite size (Å) | 24 | 48 | 40 | 27 | 50 |
| SBO hydrogenation activity (time to reach IV of 70) (min) | 23.5 | 31.5 | 58.5 | 36.0 | 26.0 |
| FO hydrogenation activity (time to reach IV of 115) (min) | 23.5 | 31.0 | 44.5 | 29.0 | 38.0 |

What is claimed is:

1. A catalyst comprising nickel, silica, alumina and magnesium, wherein the nickel to silicon atomic ratio is 2 to 30, the nickel to aluminum atomic ratio is 9 to 40, and the nickel to magnesium atomic ratio is 5-75, the catalyst having an average particle size of about 1 to about 20 μm.

2. The catalyst according to claim 1, having an average particle size of about 3 to about 8 μm.

3. The catalyst according to claim 1, wherein the nickel to silicon atomic ratio is at 6.5 to about 22.

4. The catalyst according to claim 1, wherein the nickel to silicon atomic ratio is 6.5 to about 15.

5. The catalyst according to claim 1, wherein the nickel to aluminum atomic ratio is about 10-35.

6. The catalyst according to claim 1, wherein the nickel to aluminum atomic ratio is about 15 to about 22.

7. The catalyst according to claim 1, wherein the nickel to magnesium atomic ratio is about 5-50.

8. The catalyst according to claim 1, wherein the nickel to magnesium atomic ratio is about 6 to about 20.

9. The catalyst according to claim 1, wherein the catalyst is coated with a protective layer, effective in preventing oxidation of the catalyst.

10. A method for preparing the catalyst according to claim 1, wherein a nickel source, a silica source, an alumina source and a magnesium source are mixed in a liquid and co-precipitated therefrom to form a catalyst precursor, the catalyst precursor is isolated from the solution, and the catalyst precursor is activated to form the catalyst, the activation comprising a reduction of at least part of the nickel content of the catalyst precursor, and optionally calcining the catalyst precursor before being reduced.

11. The method for preparing the catalyst according to claim 10, wherein the nickel source comprises a nickel salt.

12. The method for preparing the catalyst according to claim 10, wherein the nickel source comprises $NiCl_2$.

13. The method for preparing the catalyst according to claim 10, wherein the silica source comprises sodium silicate.

14. The method for preparing the catalyst according to claim 10, wherein the alumina source comprises an aluminum salt.

15. The method for preparing the catalyst according to claim 10, wherein the magnesium source comprises a magnesium salt.

16. The method for preparing the catalyst according to claim 10, wherein the magnesium source comprises $MgCl_2$.

17. The method for preparing the catalyst according to claim 10, wherein the liquid comprises water.

18. The method for preparing the catalyst according to claim 10, wherein the co-precipitation to form the catalyst precursor is performed at an alkaline pH.

19. The method for preparing the catalyst according to claim 10, wherein the co-precipitation to form the catalyst precursor is performed at a temperature in a range of 20 to 100° C.

20. The method for preparing the catalyst according to claim 10, wherein the catalyst precursor is activated to form the catalyst with hydrogen at a temperature in a range of 250 to 600° C. for 1 to 5 hours.

* * * * *